US010449839B2

(12) United States Patent
Sinaguinan et al.

(10) Patent No.: US 10,449,839 B2
(45) Date of Patent: Oct. 22, 2019

(54) METHODS AND SYSTEMS FOR CONTROLLING A TRANSPARENCY OF A WINDOW OF A VEHICLE

(71) Applicant: HONDA MOTOR CO., LTD., Tokyo (JP)

(72) Inventors: Justin Sinaguinan, Playa Del Rey, CA (US); Bradford D. Kent, San Pedro, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 15/711,719

(22) Filed: Sep. 21, 2017

(65) Prior Publication Data
US 2019/0084383 A1    Mar. 21, 2019

(51) Int. Cl.
*B60J 3/04* (2006.01)
*B32B 17/10* (2006.01)
(Continued)

(52) U.S. Cl.
CPC .......... *B60J 3/04* (2013.01); *B32B 17/10036* (2013.01); *E06B 9/24* (2013.01); *G02F 1/01* (2013.01);
(Continued)

(58) Field of Classification Search
CPC ....... B60J 3/00; B60J 3/04; G02F 1/00; G02F 1/01; G02F 1/163; G02F 1/15; B32B 17/00; B32B 17/10036; B60Q 9/006–008; G08G 1/00; G08G 1/01; G08G 1/0125; G08G 1/017; G08G 1/0962; G08G 1/0965; G08G 1/0967; G08G 1/0968; G06F 3/038; G06F 3/048; G06F 3/0484; B60K 35/00; B60K 2310/26; B60K 2310/262; B60K 2310/264; B60K 2350/352; B60K 2350/901; B60K 2350/903; G02B 27/01; G02B 27/0101; G02B 2027/0138; G02B 2027/014; G02B 2027/0141; E06B 9/24
(Continued)

(56) References Cited

U.S. PATENT DOCUMENTS 3,314,065 A * 4/1967 Steigerwalt ............... G01P 3/66
340/936
3,876,940 A * 4/1975 Wickord .............. G08G 1/0965
340/902
(Continued)

OTHER PUBLICATIONS

Davies, Alex, "Shades Are So 2015. These Airplane Windows Tint Themselves," https://www.wired.com/2016/04/shades-2015-airplane-windows-tint/, Apr. 8, 2016.
(Continued)

*Primary Examiner* — Loha Ben
(74) *Attorney, Agent, or Firm* — Arent Fox LLP

(57) ABSTRACT

The present disclosure is directed to systems and methods for controlling a transparency of a window of a vehicle. The system may include a sensor for detecting a user of the vehicle in proximity to the vehicle. The system may also include a control system for controlling the transparency of the window based on the proximity of the user to the vehicle by adjusting a transmittance of a plurality of thin-film-transistors (TFTs) of the window to control the transparency of the window.

20 Claims, 5 Drawing Sheets

(51) Int. Cl.
  *E06B 9/24* (2006.01)
  *G02F 1/01* (2006.01)
  *G02B 27/01* (2006.01)
  *G02F 1/15* (2019.01)

(52) U.S. Cl.
  CPC ............ *G02F 1/15* (2013.01); *B60K 2310/26* (2013.01); *G02B 2027/014* (2013.01)

(58) Field of Classification Search
  USPC ...... 359/245, 265, 267, 273, 275; 701/1, 23, 701/28; 715/710, 711, 714, 734, 772, 715/781; 340/901–904; 345/105, 156
  See application file for complete search history.

(56) References Cited

U.S. PATENT DOCUMENTS

| | | | | |
|---|---|---|---|---|
| 4,694,295 | A * | 9/1987 | Miller | .................... G01S 15/931 |
| | | | | 340/435 |
| 5,373,482 | A * | 12/1994 | Gauthier | ............ B60Q 1/0023 |
| | | | | 367/13 |
| 8,102,586 | B2 | 1/2012 | Albahri | |
| 8,513,661 | B2 * | 8/2013 | Takahashi | ........... H01L 29/7869 |
| | | | | 257/43 |
| 8,739,035 | B2 * | 5/2014 | Trethewey | ............ G06F 1/1626 |
| | | | | 715/705 |
| 8,994,676 | B2 * | 3/2015 | Kuhn | ..................... B60K 35/00 |
| | | | | 345/156 |
| 9,767,693 | B2 * | 9/2017 | Lee | ......................... G08G 1/166 |
| 10,013,260 | B2 * | 7/2018 | Trethewey | ............ G06F 1/1626 |
| 10,115,312 | B2 * | 10/2018 | Lee | ......................... G08G 1/166 |
| 2014/0148996 | A1 | 5/2014 | Watkins | |

OTHER PUBLICATIONS

Irving, M., "Smart-tinting glass can shade on demand or automatically," http://newatlas.com/kinestral-halio-glass-smart-tint/46867/, Dec. 9, 2016.

Timmer, J., "New material could make for smart windows that adjust to building's needs", ArsTechnica, Aug. 15, 2013, https://arstechnica.com/science/2013/08/new-material-could-make-for-smart-windows-that-adjust-to-buildings-needs/.

Wesoff, E., "View Has Raised More Than $500 Million for Smart Adaptive Windows", GreenTechMedia. Aug. 13, 2015, https://www.greentechmedia.com/articles/read/view-has-raised-more-than-500-million-for-smart-adaptive-windows.

Williams, C., "Low-cost, tunable smart windows developed with 'electrokinetic pixels'", Jun. 16, 2015, https://www.extremetech.com/extreme/208174-low-cost-tunable-smart-windows-developed-with-electrokinetic-pixels.

* cited by examiner

METHODS AND SYSTEMS FOR CONTROLLING A TRANSPARENCY OF A WINDOW OF A VEHICLE

TECHNICAL FIELD

The present disclosure relates to methods and systems for controlling a transparency of a window of a vehicle.

BACKGROUND

Some vehicle manufacturers may produce vehicles with tinted windows. Generally, a "factory tint" may be implemented by dying glass within the windows. For vehicles without a "factory tint," an aftermarket tint may be achieved by applying a film to the interior of the vehicle's windows. Window tinting may reduce the Visible Light Transference (VLT) and is graded on the percentage of light that is transferred, namely the lower the percentage of light transmittance, the darker the tint. There may be many advantages to having tinted windows, either from the factory or an aftermarket tint, including providing privacy, blocking harmful UV rays, reducing heat in the vehicle, and reducing the risk of glass shattering during an accident. However, when the vehicle windows are tinted, the driver may not be able to adjust the transparency of the windows once the tint is installed.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to a system for controlling a transparency of a window of a vehicle. The system includes a sensor for detecting a user of the vehicle in proximity to the vehicle. The system also includes a control system for controlling the transparency of the window based on the proximity of the user to the vehicle by adjusting a transmittance of a plurality of thin-film-transistors (TFTs) of the window to control the transparency of the window.

In another aspect, the present disclosure relates to a method for controlling a transparency of a window of a vehicle. The method includes detecting, by a sensor coupled to the vehicle, a user of the vehicle in proximity to the vehicle. The method also includes controlling the transparency of the window based on the proximity of the user to the vehicle by adjusting a transmittance of a plurality of thin-film-transistors (TFTs) of the window to control the transparency of the window.

In a further aspect, the present disclosure relates to a non-transitory computer-readable storage medium containing executable computer program code. The code includes instructions configured to cause a processor to determine a proximity of a user to a vehicle and to control a transparency of a window of the vehicle based on the proximity of the user to the vehicle by adjusting a transmittance of a plurality of thin-film-transistors (TFTs) of the window to control the transparency of the window.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
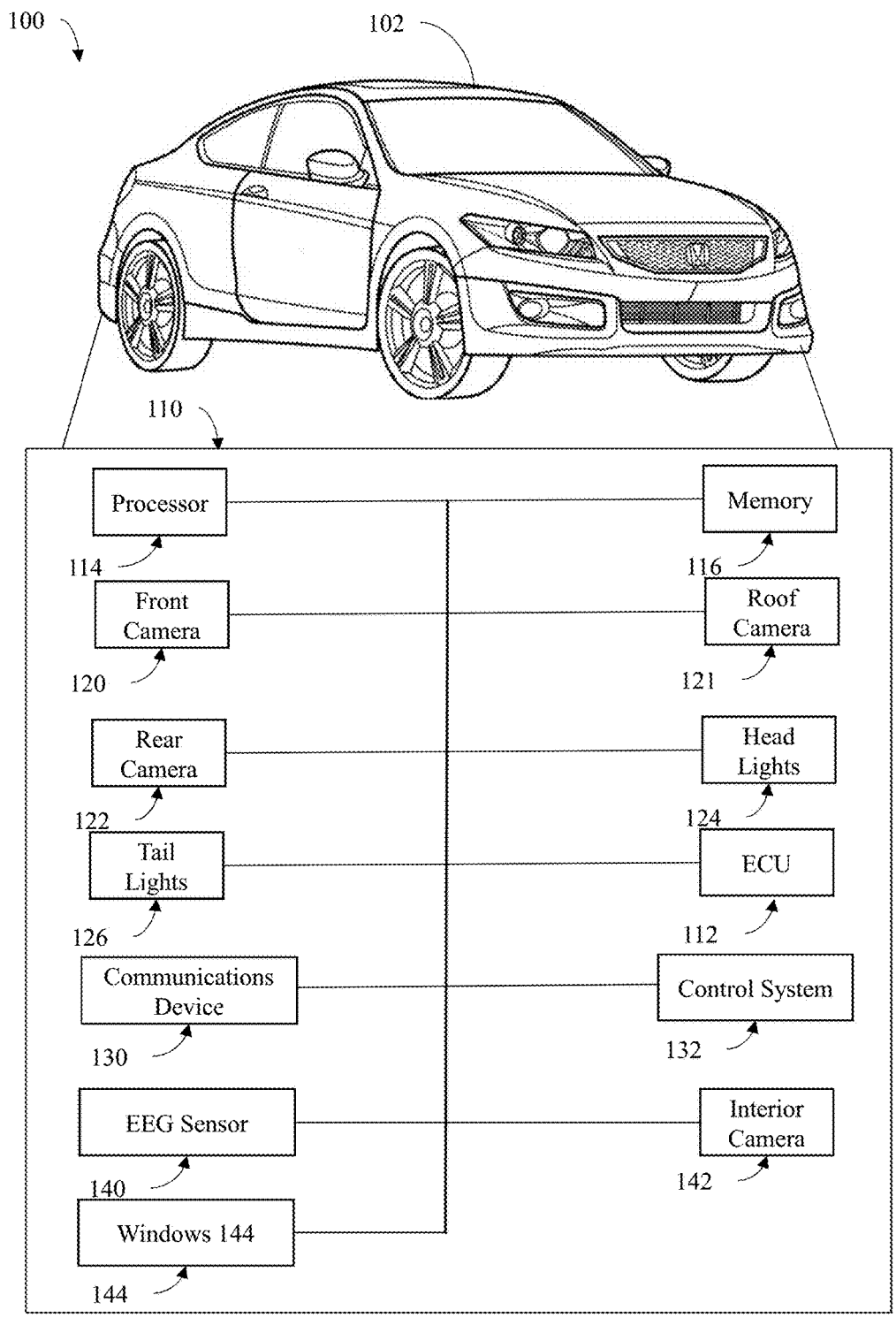
FIG. 1 illustrates a schematic view of an exemplary operating environment of a vehicle system in accordance with aspects of the present disclosure.
Figure 2A:
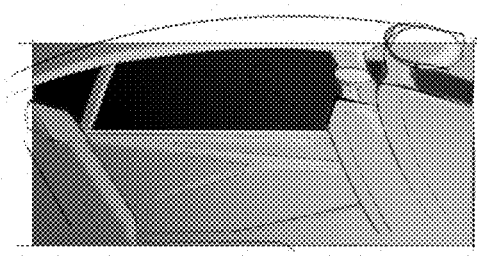
FIGS. 2A-2F illustrate an exemplary transformation of a window in accordance with aspects of the present disclosure.
Figure 2B:
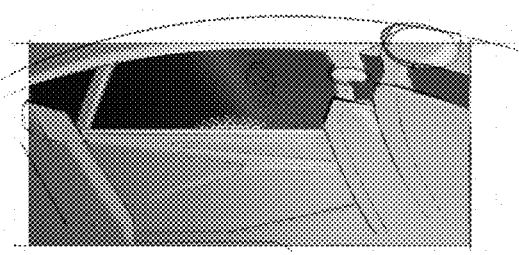
Figure 2C:
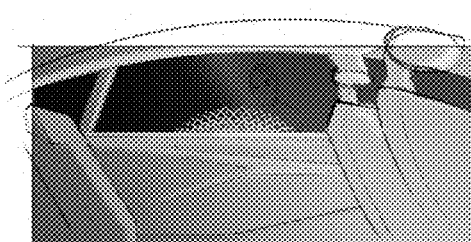
Figure 2D:
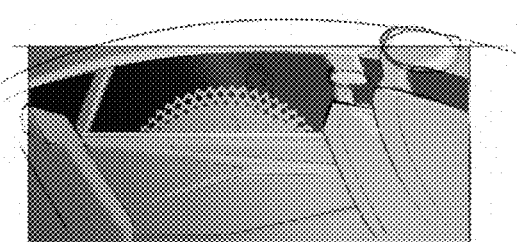
Figure 2E:
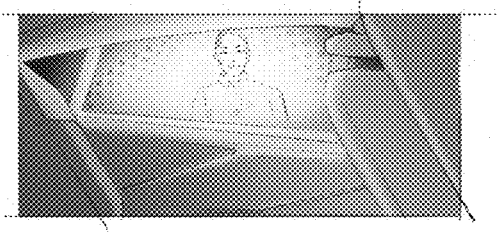
Figure 2F:
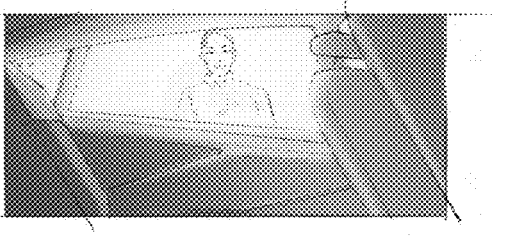

Generally described, the present disclosure provides systems and methods controlling the transparency of a window of a vehicle. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems, vehicle telephone systems, and the like.

The vehicle 102 may include head lights 124 and tail lights 126, which may include conventional lights used on vehicles. The head lights 124 and tail lights 126 may be controlled by the vehicle system 110 and/or ECU 112 for providing various notifications. For example, the head lights 124 and/or tail lights 126 may be activated or controlled to provide desirable lighting when scanning the environment of the vehicle 102. The head lights 124 and tail lights 126 may also provide information such as an acknowledgment of a remote command by flashing.

The vehicle system 110 may also include a front camera or other image-capturing device 120, roof camera or other image-capturing device 121, rear camera or other image capturing device 122, and interior camera or other image capturing device 142 that may each be connected to the ECU 112 and/or a control system 132 to provide images of the environment surrounding the vehicle 102, as well as images within the vehicle 102. In some aspects, each of the front camera 120, the roof camera 121, and/or the rear camera 122 may be a digital camera capable of capturing one or more images or image streams, or may be another image capturing device, such as a scanner. The front camera 120 may be a camera configured to capture an image of an environment directly in front of the vehicle 102. The rear camera 122 may be a camera configured to capture an image of an environment directly behind the vehicle 102. The roof camera 121 may be a camera configured to provide a broader view of the environment surrounding the vehicle 102. In further aspects, the interior camera 142 may be may be a digital camera capable of capturing one or more images or image streams.

The vehicle system 110 may also include a processor 114 and a memory 116 that communicate with the front camera 120, roof camera 121, rear camera 122, interior camera 142, head lights 124, tail lights 126, communications device 130, and/or control system 132. The control system 132 may include a computer system, as shown with respect to FIG. 3 described below.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

In some aspects, the vehicle 102 may also include windows 144 that have an array of pixels formed using a plurality of thin-film-transistors (TFTs), as should be understood by those of ordinary skill in the arts. That is, the windows 144 may be formed using a thin-film-transistor liquid-crystal display (TFT LCD). As should be understood by those of ordinary skill in the arts, a TFT LCD is an active-matrix LCD. In some aspects, the TFT LCD include a thin film of, for example, amorphous silicon, poly-crystalline silicon, etc., that is formed on a glass panel. In some aspects, a transmittance of each pixel may be controlled using a control signal that is generated based on a proximity of a user to the vehicle 102. For example, the TFTs may be a three channel transistor with only two channels being used to either make the windows 144 opaque or transparent.

The vehicle 102 may also include a sensor 140 for detecting the presence of the user of the vehicle 102. For example, in some aspects, the sensor 140 may be a proximity sensor configured to detect the presence of a user without physical contact between the vehicle 102 and the user. In some aspects, the proximity sensor 140 may be used in conjunction with a key fob of the user. In such aspects, the proximity sensor 140 may emit signal, such as an electromagnetic field, and measure the strength of a return signal from the key fob. When the return signal strength exceeds a predetermined value, the proximity sensor 140 may indicate that the user is within the predetermined distance. In other aspects, the proximity sensor 140 may be used in conjunction with the user's mobile device. In such aspects, the proximity sensor 140 may detect a radiation and/or low frequency electromagnetic fields emitted by the mobile device. When the radiation and/or low frequency electromagnetic fields emitted by the mobile device exceed a predetermined value, the proximity sensor 140 may indicate that the user is within the predetermined distance. In some aspects, both the key fob and the mobile device may transmit a unique identification signal to the proximity sensor 140, such that the proximity sensor 140 recognizes pre-identified users. In further aspects, the sensor 140 may be biometric scanner configured to authenticate and/or identify the user of the vehicle 102 when the user is within range of the biometric scanner. For example, the biometric scanner may be a retina scanner or a facial recognition scanner. In some aspects, the sensor 140 may send a signal notifying the control system 132 that the user has been detected.

The control system 132 may control the transparency of the windows 144 of the vehicle 102 using the TFTs. For example, when the user is located within the predetermined distance of the vehicle 102, the control system 132 may send a first control signal to control the transmittance of the TFT's. In this way, the control signal may be used to transform the windows 144 from being opaque to transparent. In some aspects, the control system 132 may determine that the user is located within the predetermined distance based on signal(s) from the key fob or the mobile device. In other aspects, the control system 132 may determine that the user is located within the predetermined distance when the retina scanner and/or the facial recognition is capable of scanning the user's retina/facial patterns, respectively. In some aspects, the first control signal may sequentially activate each of the TFTs, such the windows 144 are fully transformed from being opaque to transparent when the user is located within the predetermined distance. In other aspects, the first control signal may sequentially activate each of the TFTs based on the proximity of the user, such that the windows 144 are progressively transformed from being opaque to transparent as the user moves closer to the vehicle 102 after crossing within the predetermined distance. For example, as the signal strength of the key fob or mobile device increases, the control system 132 may determine that the user is closer to the vehicle 102, and as such, the first control signal activates the TFTs of the windows 144.

In some aspects, the windows 144 may be transformed from being opaque to transparent in a stylized manner. For example, as illustrated in FIGS. 2A-2F, the windows 144 may be transformed from the center of the window outward in a diamond pattern. Although FIGS. 2A-2F illustrate the windows 144 being transformed in a diamond pattern, it should be understood by those of ordinary skill in the arts that other stylized patterns are also contemplated according to aspects of the present disclosure.

In other aspects, the control system may also deactivate each of the TFTs based on the proximity of the user, such that the windows 144 are transformed from being transparent to opaque based on the proximity of the user to the vehicle. For example, in some aspects, the control signal may sequentially deactivate each of the TFTs, such the windows 144 are fully transformed from being transparent to opaque when the user is located outside the predetermined distance. In other aspects, the control signal may sequentially deactivate each of the TFTs based on the proximity of the user, such that the windows 144 are progressively transformed from being transparent to opaque as the user moves further away from the vehicle 102, such that the each of the TFTs are deactivated when the user exceeds the predetermined distance.

The control system 132 may also control interior lighting of the vehicle 102. For example, when the user is located within a predetermined distance of the vehicle 102, the control system 132 may send a second control signal to activate interior lighting of the vehicle. In some aspects, the interior lighting may be activated when available lighting exterior to the vehicle 102 is below a threshold, e.g., before sunrise or after sunset, in dimly lit parking garages, etc. The control system 132 may determine the lighting exterior to the vehicle 102 based on images captured by one or more of the front camera 120, the roof camera 121, or the rear camera 122. The first control signal and/or the second control signal may be a low-voltage differential signal (LVDS).

Figure 3:
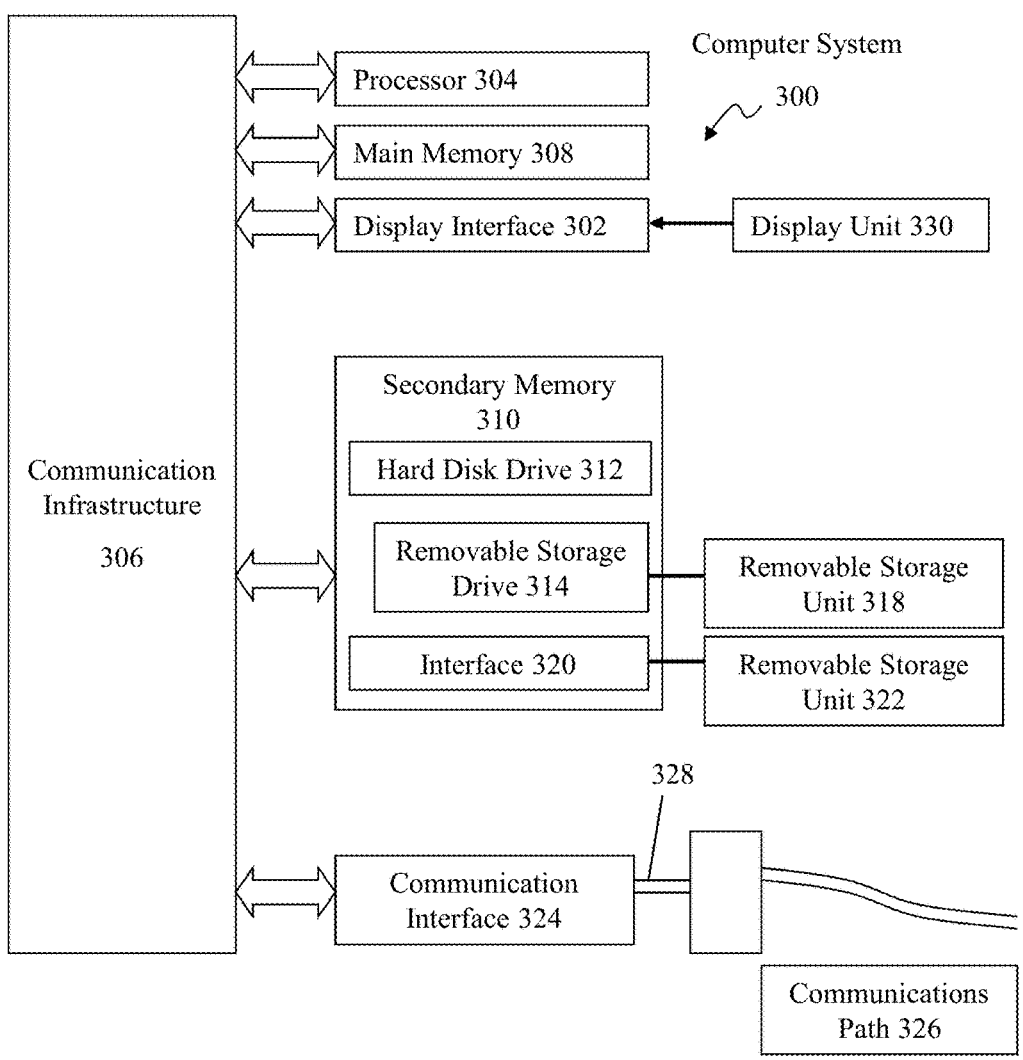
FIG. 3 illustrates various features of an exemplary computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
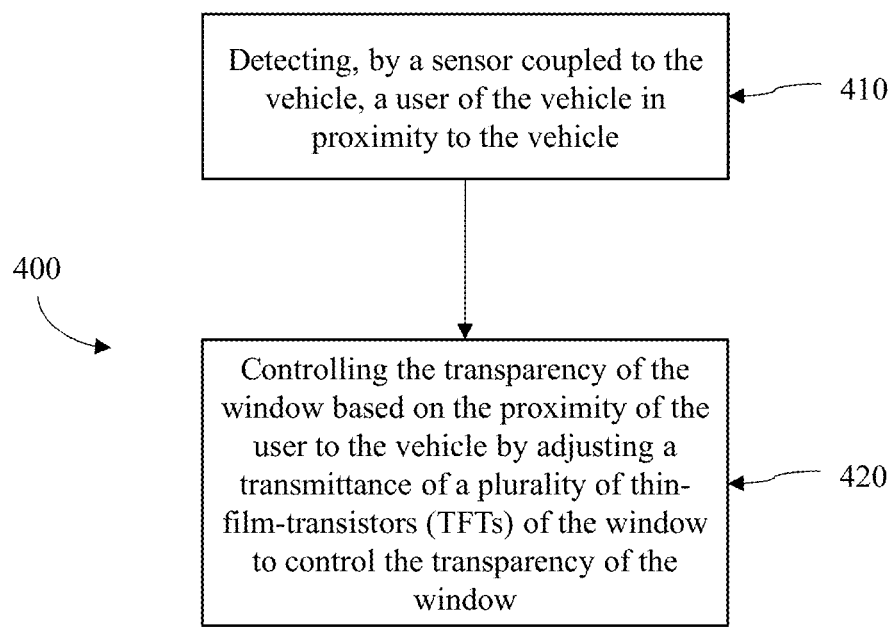
FIG. 4 illustrates a flowchart for controlling the transparency of a window of a vehicle.

FIG. 4 illustrates a flowchart for controlling a transparency of a window of a vehicle. A method 400 includes detecting, by a sensor coupled to the vehicle, a user of the vehicle in proximity to the vehicle 410. The method also includes controlling the transparency of the window based on the proximity of the user to the vehicle by adjusting a transmittance of a plurality of thin-film-transistors (TFTs) of the window to control the transparency of the window 420.

Figure 5:
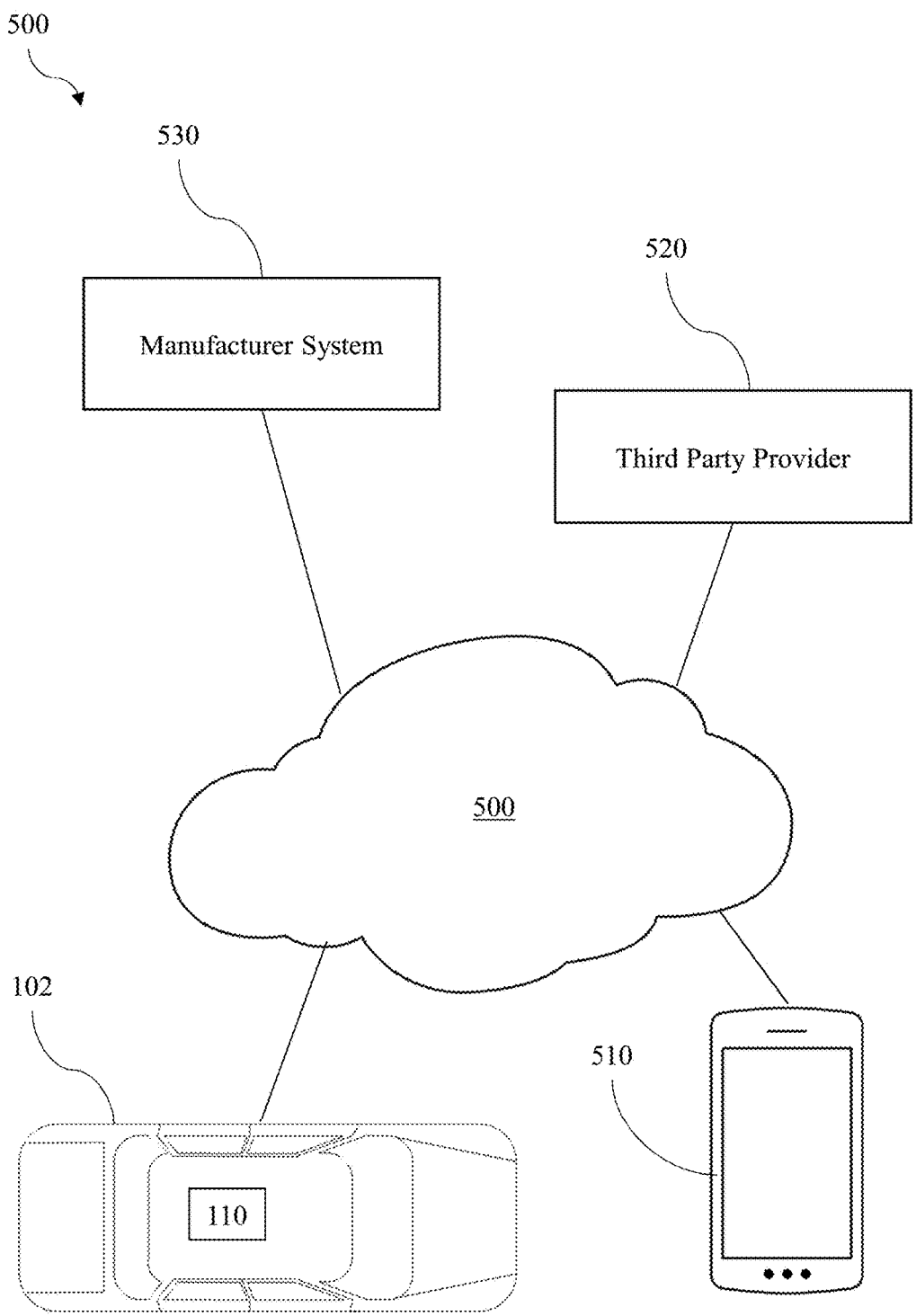
FIG. 5 illustrates an exemplary network for managing the vehicle system, in accordance with aspects of the present disclosure.

FIG. 5 illustrates an exemplary network 500 for managing the vehicle system 110. The network 500 may be a communications network that facilitates communications between multiple systems. For example, the network 200 may include the Internet or another Internet Protocol (IP) based network. The network 500 may enable the vehicle system 110 to communicate with a mobile device 510, a third party provider 520, or a manufacturer system 530. The manufacturer system 530 may include a computer system, as shown with respect to FIG. 3 described above, associated with one or more vehicle manufacturers or dealers. The manufacturer system 530 may include one or more databases that store data related to the strength of the return signal from the key fob or the radiation and/or low frequency electromagnetic fields emitted by the mobile device that indicates that the user is within the predetermined distance. The manufacturer system 530 may also store data related to the unique identification signal of the key fob or the mobile device of the user. The manufacturer system 530 may also store data related to the biometric information of the user.

The vehicle system 110 within the vehicle 102 may communicate with the network 500 via the communications device 130. In some aspects, the vehicle system 110 may, for example, transmit/receive information to/from the manufacturer system 530 related to the strength of the return signal from the key fob or the radiation and/or low frequency electromagnetic fields emitted by the mobile device that indicates that the user is within the predetermined distance, the unique identification signal of the key fob or the mobile device of the user, or the biometric information of the user.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for controlling a transparency of a window of a vehicle, the system comprising:
   a sensor detecting a user of the vehicle in proximity to the vehicle;
   a control system controlling the transparency of the window based on the proximity of the user to the vehicle, by adjusting a transmittance of a plurality of thin-film-transistors (TFTs) of the window.

2. The system of claim 1, wherein the sensor comprises a proximity sensor detecting the user based on a strength of a return signal from a key fob of the user or a signal emitted by a mobile device of the user.

3. The system of claim 2, wherein the proximity sensor indicates that the user is within a predetermined distance of the vehicle when the return signal strength from the key fob or the signal emitted by the mobile device of the user exceeds a predetermined value.

4. The system of claim 1, wherein the sensor comprises a biometric scanner identifying the user of the vehicle when the user is within range of the biometric scanner.

5. The system of claim 1, wherein the window is transformed from being opaque to transparent by sequentially activating each of the plurality TFTs when the user is located within a predetermined distance of the vehicle.

6. The system of claim 5, wherein the control system activates interior lighting of the vehicle when the user is located within the predetermined distance of the vehicle.

7. The system of claim 1, wherein the window is progressively transformed from being opaque to transparent as the user moves closer to the vehicle after crossing within a predetermined distance of the vehicle.

8. The system of claim 1, wherein the window is transformed from being transparent to opaque by sequentially deactivating each of the plurality TFTs when the user is located outside a predetermined distance of the vehicle.

9. The system of claim 1, wherein the window is progressively transformed from being transparent to opaque as the user moves further away from the vehicle.

10. A method for controlling a transparency of a window of a vehicle, the method comprising:
    detecting, by a sensor coupled to the vehicle, a user of the vehicle in proximity to the vehicle; and
    controlling the transparency of the window based on the proximity of the user to the vehicle by adjusting a transmittance of a plurality of thin-film-transistors (TFTs) of the window to control the transparency of the window.

11. The method of claim 10, wherein the sensor comprises a proximity sensor, and the detecting the user comprises detecting the user based on a strength of a return signal from a key fob of the user or a signal emitted by a mobile device of the user.

12. The method of claim 11, wherein the proximity sensor indicates that the user is within a predetermined distance of the vehicle when the return signal strength from the key fob or the signal emitted by the mobile device of the user exceeds a predetermined value.

13. The method of claim 10, wherein the sensor comprises a biometric scanner, and the detecting the user comprises authenticating or identifying the user of the vehicle when the user is within range of the biometric scanner.

14. The method of claim 10, wherein controlling the transparency of the window comprises transforming the window from being opaque to transparent by sequentially activating each of the plurality TFTs when the user is located within a predetermined distance of the vehicle.

15. The method of claim 10, wherein controlling the transparency of the window comprises progressively transforming the window from being opaque to transparent as the user moves closer to the vehicle after crossing within a predetermined distance of the vehicle.

16. The method of claim 10, wherein controlling the transparency of the window comprises transforming the window from being transparent to opaque by sequentially deactivating each of the plurality TFTs when the user is located outside a predetermined distance of the vehicle.

17. The method of claim 10, wherein controlling the transparency of the window comprises progressively transforming the window from being transparent to opaque as the user moves further away from the vehicle.

18. A non-transitory computer-readable storage medium containing executable computer program code, the code comprising instructions configured to cause a processor to:
determine a proximity of a user to a vehicle; and
control a transparency of a window of the vehicle based on the proximity of the user to the vehicle by adjusting a transmittance of a plurality of thin-film-transistors (TFTs) of the window to control the transparency of the window.

19. The non-transitory computer-readable storage medium claim 18, wherein controlling the transparency of the window comprises:
transforming the window from being opaque to transparent by sequentially activating each of the plurality TFTs when the user is located within a predetermined distance of the vehicle; or
progressively transforming the window from being opaque to transparent as the user moves closer to the vehicle after crossing within a predetermined distance.

20. The non-transitory computer-readable storage medium of claim 18, wherein controlling the transparency of the window comprises:
transforming the window from being transparent to opaque by sequentially deactivating each of the plurality TFTs when the user is located outside a predetermined distance of the vehicle; or
progressively transforming the window from being transparent to opaque as the user moves further away from the vehicle.

* * * * *